United States Patent [19]

Ward et al.

[11] Patent Number: 5,258,682
[45] Date of Patent: Nov. 2, 1993

[54] AXIAL ZONE BLOCK ASSEMBLY FOR ELECTRICAL GENERATORS

[75] Inventors: Robert T. Ward; Cheryl A. Costa; Larry L. Zeller, all of Winter Park; Albert C. Sismour, Jr., Gasselberry, all of Fla.

[73] Assignee: Westinghouse Electric Corp., Pittsburgh, Pa.

[21] Appl. No.: 976,776

[22] Filed: Nov. 16, 1992

[51] Int. Cl.$^5$ .................................................. H02K 3/46
[52] U.S. Cl. ..................................... 310/270; 310/45; 310/91
[58] Field of Search ............... 310/270, 271, 272, 273, 310/261, 262, 214, 91, 45; 29/598; 403/356, 357, 220

[56] References Cited

U.S. PATENT DOCUMENTS

| 4,469,971 | 9/1984 | Moore | 310/214 |
| 4,792,713 | 12/1988 | Bush | 310/261 |
| 5,113,114 | 5/1992 | Shih et al. | 310/270 |

FOREIGN PATENT DOCUMENTS 0187179 12/1955 Austria ...................... 310/270

*Primary Examiner*—R. Skudy
*Attorney, Agent, or Firm*—G. R. Jarosik

[57] ABSTRACT

A zone block assembly for maintaining a pressure barrier in an end area of a rotor in an electrodynamic system such as an electrical generator includes a zone block which is constructed and arranged to be positioned between a rotor and an end winding in an electrodynamic system to maintain a pressure barrier; and a spring in contact with the zone block for biasing the zone block with respect to the rotor. The spring is fabricated from a material which is non-metallic, so that it will not create destructive metallic projectiles within the electrodynamic system if it breaks as a result of fatigue.

20 Claims, 2 Drawing Sheets

AXIAL ZONE BLOCK ASSEMBLY FOR ELECTRICAL GENERATORS

BACKGROUND OF THE INVENTION

1. Field of the Invention

This invention relates to the field of electrodynamic systems, such as electrical generators or motors. More specifically, this invention relates to an improved axial zone block assembly for maintaining a pressure differential in the end turn area of a rotor in such a system.

2. Description of the Prior Art

In certain electrical generators which are manufactured by the assignee of this invention, Westinghouse Electric Corporation, high and low pressure zones are intentionally designed within the system to induce the flow of coolant through certain heat generating components of the system.

FIG. 1 depicts a portion of an electrical generator according to a prior art design. Specifically, FIG. 1 depicts a prior art axial zone assembly 10, shown positioned adjacent to a stationary stator 12. A rotor shaft 14 is mounted to rotate with respect to and within stator 12. A plurality of end turns 16 are mounted to an end of rotor shaft 14.

To separate an intended high pressure zone on one side of rotor shaft 14 from a low pressure zone on an opposite side, an axial baffle block 24 is positioned in a slot 17 that is defined in an end length of rotor shaft 14. Slot 17 is defined in rotor shaft 14 by a slot bottom 18, and has a depth which is equal to the distance between slot bottom 18 and an outer diameter 20 of rotor shaft 14. A steel ripple spring 22 is positioned between rotor shaft 14 and the bottom of axial baffle block 24.

During normal operation of the electrical generator, rotor shaft 14 rotates at high speed relative to stator 12. End winding 16, baffle block 24, and spring 22 rotate as a unit with rotor shaft 14. At high speed rotation, centripetal acceleration forces baffle block 24 against end turns 16. However, at low speed rotation, baffle block would tend to be able to move between slot bottom 18 and end turns 16 were it not for the presence of spring 22. Spring 22 effectively biases baffle block 24 against end turns 16 during low speed rotation, preventing such movement.

However, spring 22 is susceptible to fatigue after long term operation of the generator. During high speed rotation, centripetal acceleration may cause spring 22 to deflect under its own weight, putting a fatigue-inducing stress on spring 22. If not replaced at proper intervals, spring 22 may break, and fragments can possibly migrate axially out from between baffle block 24 and slot 17. Once a spring fragment is no long constrained by the baffle block 24, it may become objective metal inside the generator, which can be very destructive.

It is clear that there has existed a long and unfilled need in the art for an improved axial zone assembly and an electrodynamic system which is less susceptible to fatigue related damage, and which is less destructive to the system if fatigue related damage should occur.

SUMMARY OF THE INVENTION

Accordingly, it is an object of the invention to provide an improved axial zone assembly for an electrodynamic system which is less susceptible to fatigue induced damage than such assemblies heretofore known.

It is further an object of the invention to provide such an assembly, in which damage to the system is minimized should fatigue related breakage occur.

In order to achieve the above and other objects of the invention, a zone block assembly for maintaining a pressure barrier in an end area of a rotor in an electrodynamic system such as an electrical generator includes, according to a first aspect of the invention, a zone block which is constructed and arranged to be positioned between a rotor and an end winding in an electrodynamic system to maintain a pressure barrier; and a spring in contact with the zone block for biasing the zone block with respect to the rotor, the spring being fabricated from a material which is non-metallic, whereby the spring will not create destructive metallic projectiles within the electrodynamic system if it breaks as a result of fatigue.

According to a second aspect of the invention, an electrodynamic system such as an electrical generator may include a stator; a rotor mounted to the stator for rotary movement within the stator, the rotor having a shaft and at least one end winding; a zone block which is positioned between the shaft and the end winding to maintain a pressure barrier; and a spring in contact with the zone block and the rotor for biasing the zone block with respect to the rotor, the spring being fabricated from a material which is non-metallic, whereby the spring will not create destructive metallic projectiles within the electrodynamic system if it breaks as a result of fatigue.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
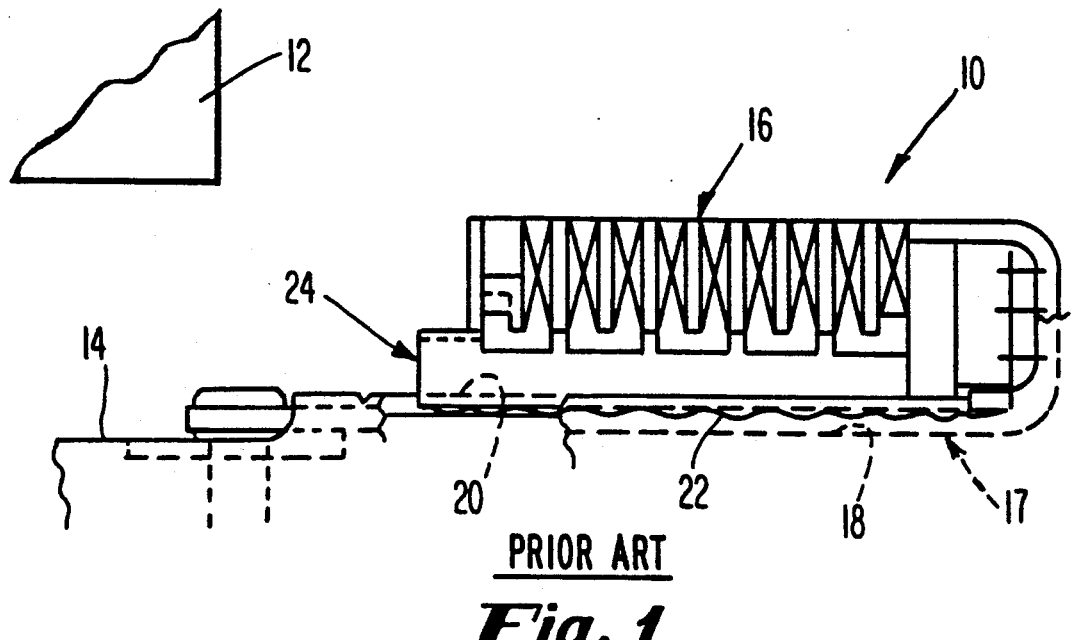
FIG. 1 is a fragmentary cross-sectional view through a prior art axial zone assembly.
Figure 2:
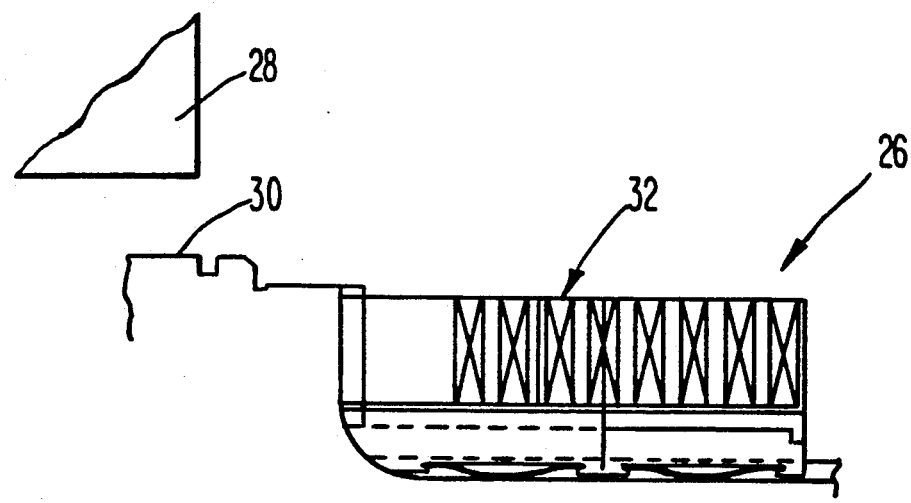
FIG. 2 is a fragmentary cross-sectional view through an improved axial zone assembly according to a preferred embodiment of the invention.
Figure 3:
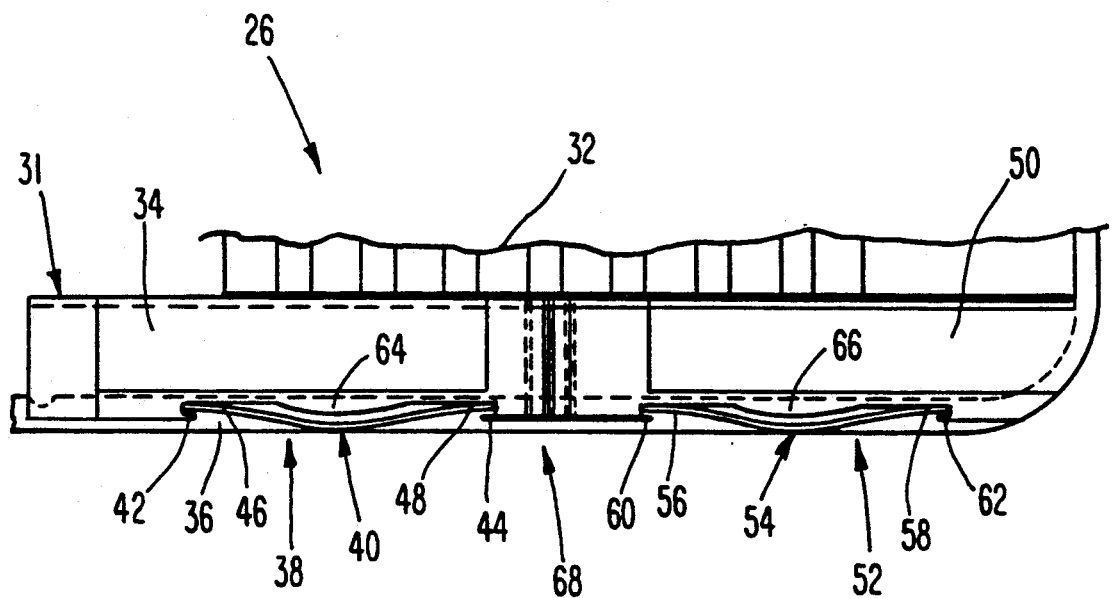
FIG. 3 is a more detailed depiction of certain aspects of the axial zone assembly depicted in FIG. 2.

Referring now to the drawings, wherein like reference numerals designate corresponding structure throughout the views, and referring in particular to FIG. 2, an improved axial zone assembly 26 according to a preferred embodiment of the invention is constructed and arranged to rotate together as a unit with a rotor shaft 30, which is mounted for rotation within a stator 28. Referring now to FIG. 3, end turns 32 are mounted for rotation with rotor shaft 30. To maintain a pressure barrier between a first side of rotor shaft 30 and a second side, an improved axial baffle block 31 which includes a first baffle block portion 34 and a second baffle block portion 50 are positioned in a slot which is defined in rotor shaft 30 by a slot bottom 36.

As may be seen in FIG. 3, first baffle block portion 34 has a recess 38 defined in a lower end thereof which is adjacent to the slot bottom 36. A first ripple spring 40 is positioned within recess 38, and is retained within recess 38 by first and second lips 42, 44 which are positioned on opposite ends of recess 38. More specifically, a first end 46 of first ripple spring 40 is retained within recess 38 by lip 42, and a second end 48 is retained within recess 38 by lip 44.

Similarly, second baffle block portion 50 has a recess 52 defined in a lower end which is adjacent to slot bottom 36. A second ripple spring 54 is positioned in recess 52 so that a first end 56 is retained by a lip 60 on one end of recess 52, and a second end 58 of ripple spring 54 is retained in recess 52 by a lip 62 on a second, opposite end of recess 52.

According to one advantageous aspect of the invention, first and second ripple springs 40, 54 are fabricated from a non-metallic material, so that the springs will not create destructive metallic projectiles within the electrodynamic system if one breaks as a result of fatigue. Preferably, springs 40, 54 are fabricated from a nonconductive material that is lighter than steel, so as to be less likely to deflect under their own weight at high speeds than a steel spring would. Preferably the springs are also fabricated from a low friction material which will be resistant to wear. Most preferably, ripple springs 40, 54 are fabricated from a reinforced polymer, most preferably a glass-cloth epoxy laminate which is coated with polytetrafluoroethylene.

According to a second advantageous aspect of the invention, first and second baffle block portions 34, 50 each include structure which is constructed and arranged to limit deflection of the respective springs 40, 54. In the preferred embodiment of the invention which is depicted in FIG. 3, this structure is embodied as first and second deflection limiting surfaces 64, 66, which are positioned on respective undersides of baffle block portions 34, 50 in recesses 38, 52.

Figure 4:
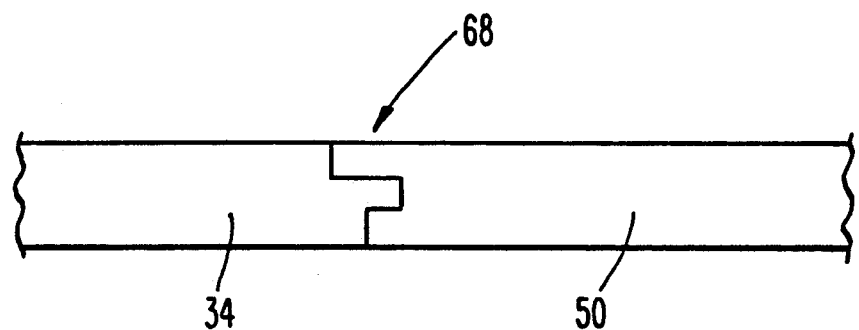
FIG. 4 is a diagrammatical view depicting an interlocking joint between two baffle block portions which are depicted in FIG. 3.

Referring to FIG. 4, it will be seen that first baffle block portion 34 and second baffle block portion 50 are protected against relative lateral displacement by an interlocking joint 68.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A zone block assembly for maintaining a pressure barrier in an end area of a rotor in an electrodynamic system such as an electrical generator, comprising:
    a zone block which is constructed and arranged to be positioned between said rotor and said end winding in said electrodynamic system to maintain a pressure barrier; and
    a spring in contact with said zone block for biasing said zone block with respect to said rotor, said spring being fabricated from a material which is non-metallic, whereby said spring will not create destructive metallic projectiles within the electrodynamic system if it breaks as a result of fatigue.

2. An assembly according to claim 1, wherein said zone block has a recess defined therein for receiving said spring.

3. An assembly according to claim 1, further comprising a second spring in contact with said zone block for also biasing said zone block with respect to said rotor.

4. An assembly according to claim 1, wherein said zone block includes first and second interlocking portions.

5. An assembly according to claim 1, wherein said spring is fabricated of a material that is lighter than steel, whereby it is less likely to deflect under its own weight at high speeds than a steel spring would.

6. An assembly according to claim 1, wherein said spring is fabricated from a material which comprises a polymer.

7. An assembly according to claim 6, wherein said material comprises a reinforced polymer.

8. An assembly according to claim 7, wherein said material is a glass-epoxy material.

9. An assembly according to claim 1, further comprising means on said zone block for limiting deflection of said spring.

10. An assembly according to claim 9, wherein said limiting means comprises a surface on said zone block which is constructed and arranged to limit deflection of said spring.

11. An electrodynamic system such as an electrical generator, comprising:
    a stator;
    a rotor mounted to said stator for rotary movement within said stator, said rotor having a shaft and at least one end winding;
    a zone block which is positioned between said shaft and said end winding to maintain a pressure barrier; and
    a spring in contact with said zone block and said rotor for biasing said zone block with respect to said rotor, said spring being fabricated from a material which is non-metallic, whereby said spring will not create destructive metallic projectiles within the electrodynamic system if it breaks as a result of fatigue.

12. An electrodynamic system according to claim 11, wherein said zone block has a recess defined therein for receiving said spring.

13. An electrodynamic system according to claim 11, further comprising a second spring in contact with said zone block for also biasing said zone block with respect to said rotor.

14. An electrodynamic system according to claim 11, wherein said zone block includes first and second interlocking portions.

15. An electrodynamic system according to claim 11, wherein said spring is fabricated of a material that is lighter than steel, whereby it is less likely to deflect under its own weight at high speeds than a steel spring would.

16. An electrodynamic system according to claim 11, wherein said spring is fabricated from a material which comprises a polymer.

17. An electrodynamic system according to claim 16, wherein said material comprises a reinforced polymer.

18. An electrodynamic system according to claim 17, wherein said material is a glass-epoxy material.

19. An electrodynamic system according to claim 11, further comprising means on said zone block for limiting deflection of said spring.

20. An electrodynamic system according to claim 19, wherein said limiting means comprises a surface on said zone block which is constructed and arranged to limit deflection of said spring.

* * * * *